United States Patent

Wright et al.

[11] Patent Number: 6,116,845
[45] Date of Patent: Sep. 12, 2000

[54] APPARATUS FOR SUPPORTING A WORKPIECE FOR TRANSFER

[75] Inventors: Joseph M. Wright; James H. Niedzielski; Stephen F. Moore, all of Fenton, Mich.

[73] Assignee: Atlas Technologies, Inc., Fenton, Mich.

[21] Appl. No.: 09/045,378

[22] Filed: Mar. 19, 1998

[51] Int. Cl.$^7$ ...................................................... B66C 1/00
[52] U.S. Cl. ................................ 414/680; 269/77; 901/15
[58] Field of Search ............................... 414/680; 901/15, 901/28, 29; 269/45, 75, 77, 78; 403/240, 241, 373, 374.1, 374.2, 374.3, 374.4, 338; 285/367, 410, 411

[56] References Cited

U.S. PATENT DOCUMENTS

| | | |
|---|---|---|
| 727,707 | 5/1903 | Stauffer et al. . |
| 1,438,380 | 12/1922 | Kaufmann . |
| 1,509,022 | 9/1924 | Noble . |
| 1,756,094 | 4/1930 | McGuirk ............................ 285/410 X |
| 2,301,230 | 11/1942 | Smith . |
| 2,630,342 | 3/1953 | Gilmont . |
| 2,809,475 | 10/1957 | Smith . |
| 2,947,555 | 8/1960 | Olsen . |
| 3,118,695 | 1/1964 | Engelhardt . |
| 3,367,612 | 2/1968 | Usiskin . |
| 3,431,759 | 3/1969 | Kidera et al. . |
| 3,885,678 | 5/1975 | Borg et al. . |
| 3,937,451 | 2/1976 | DiPaola et al. ............................ 269/45 |
| 3,961,854 | 6/1976 | Jaquet . |
| 4,185,808 | 1/1980 | Donohoe et al. . |
| 4,392,645 | 7/1983 | Westphal ................................ 269/45 X |
| 4,697,449 | 10/1987 | Harsch et al. . |
| 4,753,103 | 6/1988 | Braun . |
| 4,776,721 | 10/1988 | Lange ................................. 403/338 X |
| 4,865,484 | 9/1989 | McConnell . |
| 5,449,138 | 9/1995 | Ciancio . |
| 5,680,787 | 10/1997 | Fisch . |

*Primary Examiner*—Donald W. Underwood
*Attorney, Agent, or Firm*—Reising, Ethington, Barnes, Kisselle, Learman & McCulloch, P.C.

[57] ABSTRACT

Articulating workpiece transfer apparatus comprises a pair of identical housings each of which has a circular flange projecting from one side of the housing and abutting one another. Each flange has adjacent its periphery a beveled edge. A circular clamp has a concave groove in which the peripheral edges of the flanges are accommodated, and such clamp is operable to apply a clamping force on each flange urging the latter into face-to-face engagement with one another. Each housing has a cylindrical opening for the accommodation of an elongate transfer arm which is linearly slideable and rotatable about the axis of the arm. Each housing includes a clamp which enables and disables relative movement between the associated arm and the housing. The housings are rotatable relative to each other about an axis which passes through both flanges and which is normal to the axis of rotation of the respective transfer arms.

3 Claims, 3 Drawing Sheets

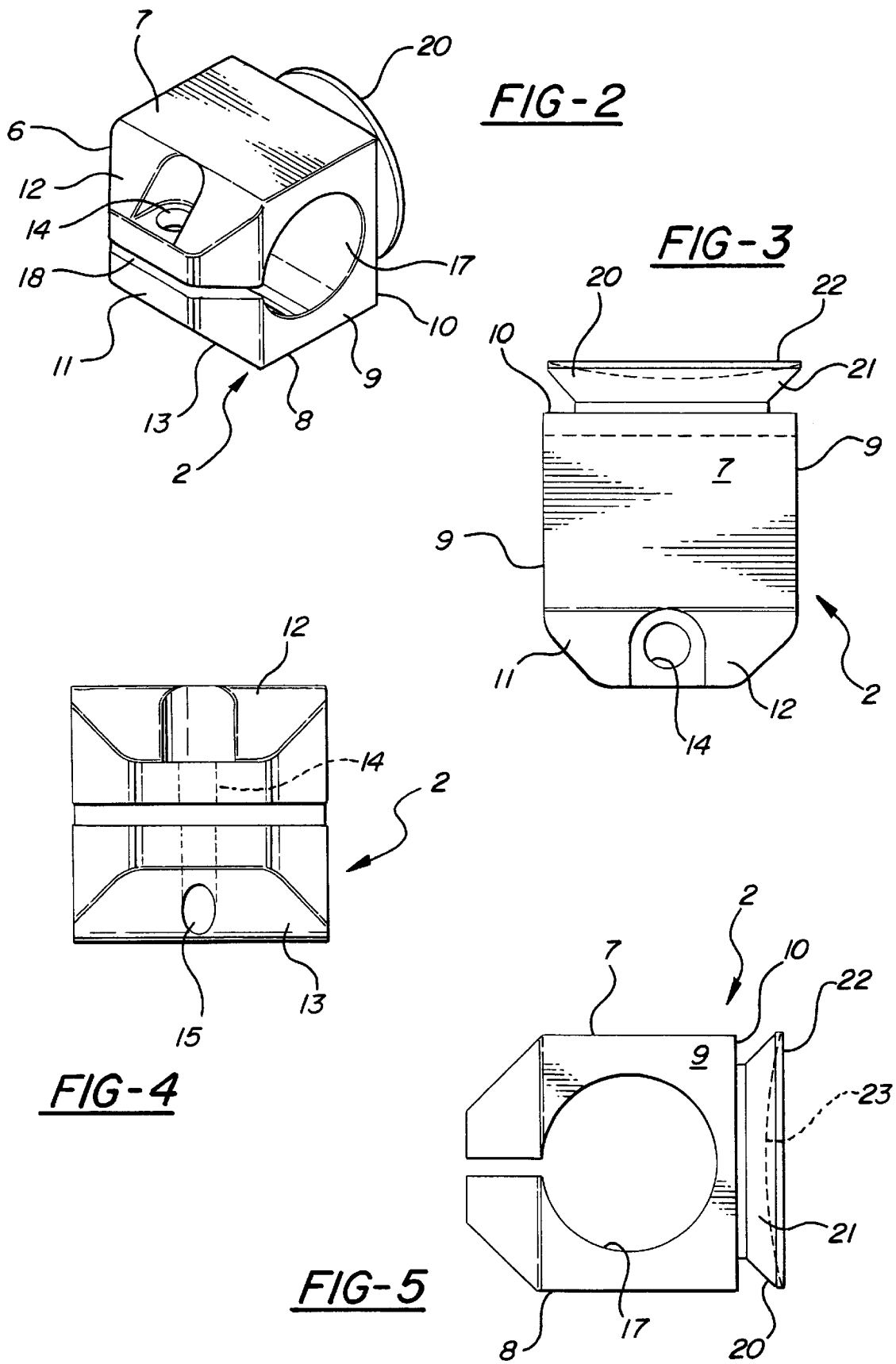

APPARATUS FOR SUPPORTING A WORKPIECE FOR TRANSFER

This invention relates to workpiece support apparatus capable of lifting, supporting, and transferring a workpiece from one workstation to another, and more particularly to a workpiece supporting arm that is substantially universally adjustable so as to enable it to accommodate workpieces of greatly different sizes and shapes.

BACKGROUND OF THE INVENTION

It is common in manufacturing operations to present a workpiece successively to a plurality of different workstations at each of which the workpiece is treated. It is conventional to lift the workpiece by transfer devices and transfer the workpiece from station to station. Since one group of workpieces that must be transferred to successive workstations may vary considerably in size and shape from a second group of workpieces, it is desirable that the transfer devices be capable of rapid adjustment to accommodate groups of workpieces of varying size and shape.

Some of the transfer devices proposed heretofore have arms that are capable of lengthwise adjustment, others have arms that are capable of rotary adjustment, and still others enable rotation of the workpiece engageable part of the transfer device. However, no known transfer device heretofore has included a supporting arm that is capable of all three kinds of adjustment.

A primary object of the invention is to provide workpiece support and transfer apparatus which is substantially universally adjustable and which may be adjusted quickly and easily.

SUMMARY OF THE INVENTION

Workpiece support apparatus constructed in accordance with the invention has an assembly of components which enables practically any workpiece to be lifted, transferred, and lowered, thereby enabling such workpiece to be moved successively from station to station by conventional transfer equipment. In the preferred embodiment the support apparatus comprises a pair of identical housings each of which has a circular opening therein for the accommodation of a cylindrical arm in the form of a rod or tube, thereby enabling the arm to be rotatable about its own axis and linearly slideable longitudinally of its axis. Adjustable clamping means enable the arm to be secured in any selected one of a number of adjusted positions.

Each housing also includes a coupling flange which projects from one side of the housing. The flange of one of the housings confronts and abuts the flange of the other of the housings and the two housings are maintained in assembled relation by an adjustable clamp which encircles the peripheries of both of the coupling flanges. The external peripheral edge of each flange is beveled to form an outwardly convex joint between the two flanges. The adjustable clamp comprises an annular retainer having a concave groove in which the beveled edges of the flanges are accommodated. The annular clamp is adjustable radially of the flanges so as to enable and disable relative rotation between the flanges and, consequently, between the housings.

One end of the arm which extends through the opening in one of the housings may be fixed to a mounting bracket, whereas one end of the arm which extends through the opening in the other housing may be accommodated in an opening in a like housing which, in turn, is clamped to a companion housing in which is accommodated another tube to which is secured a support that is engageable with the workpiece that is to be transferred.

Each of the arms carried by each of the housings is axially slideable and rotatable about its own axis, and each of the housings is rotatable about a second axis which is normal to the axes of rotation of the arms. Consequently, the workpiece support is rotatable about two mutually normal axes and is longitudinally adjustable between retracted and projected positions, thereby enabling the support apparatus to accommodate workpieces of greatly differing size and shape.

THE DRAWINGS

Support apparatus constructed in accordance with the presently preferred embodiment of the invention is illustrated in the accompanying drawings, wherein:

FIG. 2 is an isometric view of one of two identical body;

FIG. 3 is a top plan view, on an enlarged scale, of the housing shown in FIG. 2;

FIG. 4 is an elevational view of one side of the housing;

FIG. 5 is an end elevational view of the housing;

THE PREFERRED EMBODIMENT

Figure 1:
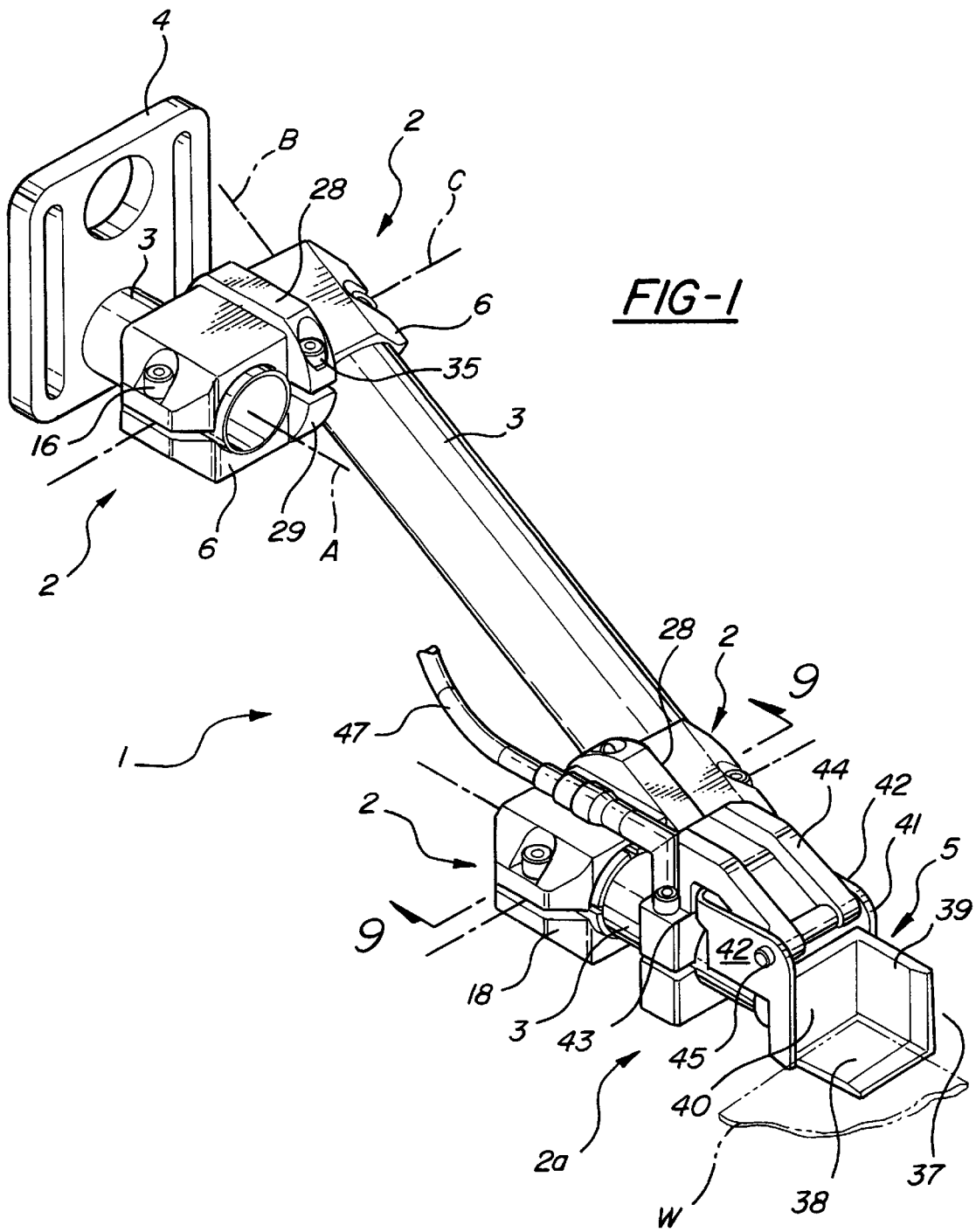
FIG. 1 is an isometric view of the support apparatus and illustrating fragmentarily a workpiece supported thereby.
Figure 6:
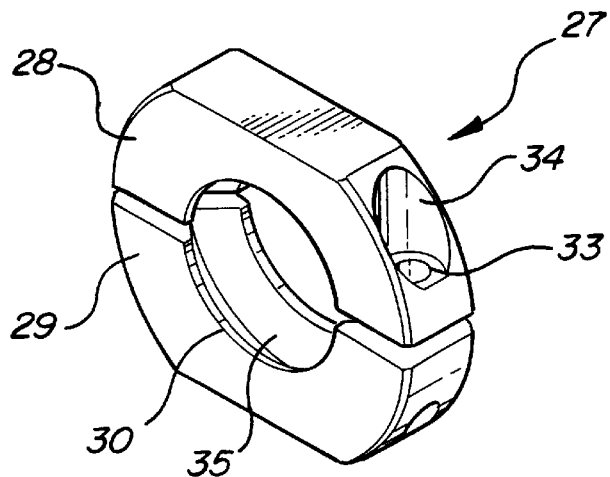
FIG. 6 is an isometric view of a clamp for use in coupling and uncoupling two housings.
Figure 7:
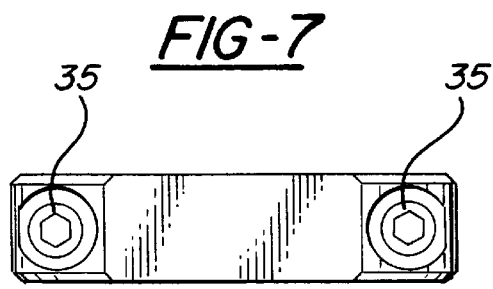
FIG. 7 is a top plan view of the clamp.
Figure 8:
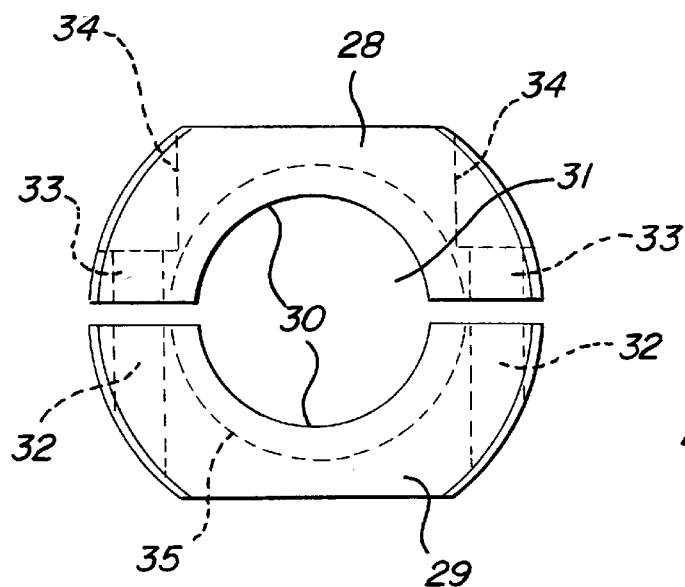
FIG. 8 is an elevational view of the clamp.

Workpiece support apparatus constructed in accordance with the presently preferred embodiment of the invention is designated generally by the reference character 1 and comprises two or more pairs of identical housings 2, a plurality of arms in the form of rods or tubes 3, a mounting bracket 4, and a workpiece support 5.

Each housing 2 comprises a body 6 formed of material having some resiliency. Each body has a flat top 7, a flat bottom 8, and two flat ends 9. The body 6 also has two opposite sides 10 and 11. The side 11 has upper and lower sloped surfaces 12 and 13, respectively which are traversed by openings 14 and 15 for the accommodation of clamping bolts 16 (FIG. 1).

Each body 6 also includes a generally cylindrical opening 17 which extends completely through the body. The side 11 is provided with a slot 18 which extends the full length of the opening 17, thereby enabling manipulation of the associated clamping bolt 16 to vary the size of the opening 17 as permitted by the resiliency of the metal or other material from which the body 6 is formed.

Figure 9:
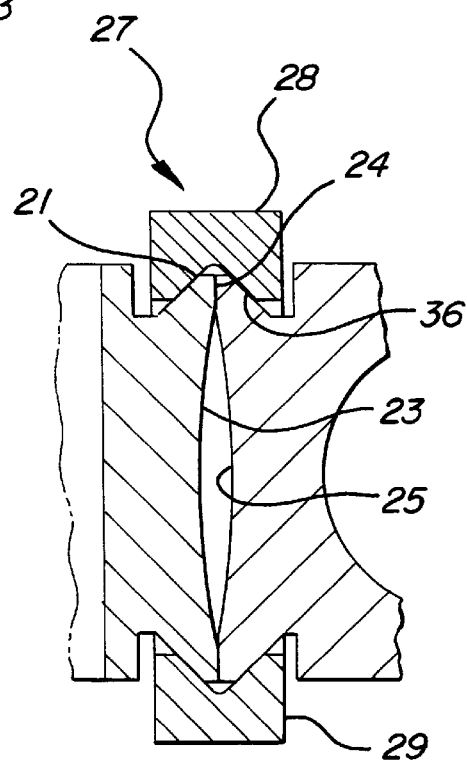
FIG. 9 is a sectional view, on an enlarged scale, taken on the line 9–9 of FIG. 1.

Secured to and projecting from the side 10 of each housing 2 is a circular coupling flange 20 having a beveled external surface 21 which terminates in a peripheral edge 22 which is laterally spaced from the side 10. The flange has a smooth face 23 having at its radially outer edge a flat seating surface 24 (FIG. 9). The remainder of the face 23 is slightly concave or dished as is shown at 25 in FIG. 9. The concavity assures secure seating of one flange upon the other.

An annular clamp 27 is provided for maintaining two adjacent housings 2 in assembled relation. The clamp 27 is composed of two halves 28 and 29 each of which has a semicircular groove 30 therein which, when the halves 28 and 29 are placed together, form a circular opening 31 having a diameter less than that of each flange 20. The part 29 has a pair of threaded openings 32 which may be aligned with smooth bores 33 formed in the part 28, and the bores 33 communicate with counterbores 34. Bolts 35 extend through the bores 33 and into the threaded bores 32 so as to enable the clamp parts 28 and 29 to be adjusted toward and away from one another.

Between the opposite sides of each of the clamp parts 28 and 29 the groove 30 is radially inwardly concave to form V-shaped retaining surfaces 36 which are complementary to the surface 21 of each of the flanges 20.

Forming a part of each support arm assembly is the workpiece support 5 which comprises what is known as a shovel 37 having a base 38 and two upstanding side walls 39 and 40 so as to enable one corner of the workpiece W to be engaged and supported by the shovel. The shovel is secured to a bail 41 having a pair of arms 42 joined at corresponding ends by a crossbar 43. A housing 2a like the housing 2 except for the inclusion of a flange 20, has mounted thereon a support arm 44 at the free end of which the support 5 is pivoted by means of a pivot pin 45. The support arm 44 also mounts a suitable proximity sensor (not shown) which is connected by an electrical conductor 47 to control means (not shown) in the same manner as is disclosed in Bierlein Patent No. 5,152,660.

To condition the apparatus for operation, the mounting bracket 4 may be fixed to a rail of workpiece transfer apparatus (not shown) associated with a progressive die stamping press such as is disclosed in U.S. Pat. No. 4,887,446. An elongate arm or tube 3 of appropriate length and secured in any suitable manner to the bracket 4 will be assembled with the left hand housing 2 (as shown in FIG. 1). One end of another tubular arm 3 then may be secured in the right hand housing 2 and have its opposite end secured to one of the two housings 2 associated with the workpiece support 5. The left hand housing adjacent the mounting bracket 4 may be slid along the longitudinal axis A of the tube 3 to a desired linear position and it may be rotated about the same axis to the desired angular position. The arm 3 associated with the right hand housing 2 may be slid and rotated about the longitudinal axis B of such arm 3 so as to locate the workpiece transfer 5 at the appropriate distance from the bracket 4. The two housings 2 then may be rotated relative to one another about the axis C so as to enable the workpiece transfer apparatus 5 to occupy an appropriate position relative to the height of the workpiece W.

The workpiece support 5 may be further adjusted by manipulation of the housings 2 that are adjacent the 5.

Following adjustment of the housings and support arms 3 relative to one another, the clamping bolts 16 and 35 may be adjusted to cause the housings to be clamped tightly to the respective arms 3 and to one another.

When two adjacent housings 2 have been rotated about the axis C to the desired relative positions and the bolts 35 of the clamp 27 are turned in a direction to cause the clamp parts 28 and 29 to bear forcibly against the respective flanges 21, the complementary surfaces 21 and 36 of the flanges and the clamp, respectively, will urge the confronting flanges 20 toward one another and cause the annular seating 24 to bear snugly against one another at the joint between the two flanges. Because of the dishing of the major portion of the surface of the face of each flange, the clamping force will be concentrated on the engaged surfaces 24 thereby providing an extremely secure positioning of the two adjacent housings relative to one another.

Since the arms 3 not only are linearly slideable and rotatable about the axes of the respective transfer arms 3, and since each two adjacent housings are rotatable relatively to one another about an axis which is normal to the axis about which the arms 3 are slideable and rotatable, it is possible to locate the workpiece engaging shovel 37 in virtually any position that enables it to perform its workpiece supporting and transferring function, almost without regard to the size or shape of the workpiece.

It will be understood that the particular workpiece supporting shovel 37 disclosed herein is only one of many that currently are in use. Other supports may be substituted for the disclosed shovel.

The disclosed embodiment is representative of a presently preferred form of the invention, but is intended to be illustrative rather than definitive thereof. The invention is defined in the claims.

We claim:

1. Substantially universally adjustable apparatus for use in supporting and transferring a workpiece from one position to another, said apparatus comprising a pair of housings each of which has a substantially circular opening extending therethrough; a substantially cylindrical, elongate arm accommodated in each of said openings for sliding movement along and for rotation about a first axis; first adjustable clamp means carried by each of said housings for varying the size of the associated opening therein to enable and disable relative movement between each housing and its associated arm; mounting means carried by one of said arms for mounting such arm on a support; support means carried by the other of said arms for engaging and supporting a workpiece; a circular flange carried by each of said housings and projecting laterally therefrom in a direction normal to the first axis, each said flange having a peripheral edge, the flanges of said housings having confronting faces and seating surfaces, said seating surfaces engaging one another and forming a joint between said flanges, each of said housings being rotatable about a second axis normal to the first axis; and second adjustable clamp means spanning the joint between said flanges and being operable to enable and disable relative movement between said housings about said second axis, each said seating surface being radially spaced from said second axis and being adjacent the peripheral edge of the associated flange, the confronting faces of said flanges being dished except for said seating surfaces.

2. The apparatus according to claim 1 wherein said flanges and said clamp means have cooperable surfaces engaging one another and shaped to urge said flanges toward one another in response to the application of clamping force on said flanges by said clamp means.

3. The apparatus according to claim 1 wherein said seating surfaces are substantially flat.

* * * * *

UNITED STATES PATENT AND TRADEMARK OFFICE
CERTIFICATE OF CORRECTION

PATENT NO. : 6,116,845
DATED : September 12, 2000
INVENTOR(S) : Joseph M. Wright et al It is certified that error appears in the above-identified patent and that said Letters Patent is hereby corrected as shown below:

Column 2, line 21, change "body" to -- housings --.

Column 3, line 49, before "5" insert -- support --;

line 61, before "24" insert -- surfaces --.

Signed and Sealed this

Seventeenth Day of April, 2001

NICHOLAS P. GODICI

*Attest:*

*Attesting Officer*     Acting Director of the United States Patent and Trademark Office